United States Patent [19]
Scherenberg et al.

[11] Patent Number: 5,140,967
[45] Date of Patent: Aug. 25, 1992

[54] EVAPORATION ELEMENT IN AN INTERNAL-COMBUSTION ENGINE CYLINDER HEAD

[75] Inventors: Dieter Scherenberg; Edgar Brütsch, both of Stuttgart, Fed. Rep. of Germany

[73] Assignee: Mercedes-Benz AG, Fed. Rep. of Germany

[21] Appl. No.: 718,360

[22] Filed: Jun. 24, 1991

[30] Foreign Application Priority Data

Jun. 26, 1990 [DE] Fed. Rep. of Germany ....... 4020266

[51] Int. Cl.$^5$ .............................................. F02M 31/00
[52] U.S. Cl. .................................... 123/549; 123/546; 123/547
[58] Field of Search ............... 123/549, 543, 546, 547, 123/557, 552

[56] References Cited

U.S. PATENT DOCUMENTS

| | | | |
|---|---|---|---|
| 1,561,815 | 11/1925 | Aske | 123/549 |
| 3,930,477 | 1/1976 | Jordan . | |
| 4,213,432 | 7/1980 | Levy | 123/549 |
| 4,279,234 | 7/1981 | Marcoux et al. | 123/549 |
| 4,387,676 | 6/1983 | Couleiro | 123/549 |
| 4,450,823 | 5/1984 | Abe et al. | 123/549 |
| 4,483,304 | 11/1984 | Yokoi et al. | 123/549 |

FOREIGN PATENT DOCUMENTS

| | | |
|---|---|---|
| 0102453 | 3/1984 | European Pat. Off. . |
| 0258207 | 7/1987 | European Pat. Off. . |
| 0337962 | 11/1930 | United Kingdom . |
| 2015081 | 2/1978 | United Kingdom . |

*Primary Examiner*—E. Rollins Cross
*Assistant Examiner*—M. Macy
*Attorney, Agent, or Firm*—Evenson, Wands, Edwards, Lenahan & McKeown

[57] ABSTRACT

In multi-valve engines, a partition wall dividing the intake channel into inlet-valve channels as an evaporation element in the intake channel of a cylinder head of an internal-combustion engine for improving the fuel-mixture formation and consequently for reducing the emission of hydrocarbons. The partition wall is electrically heated by a heating bar and is subjected to fuel substantially tangentially from a fuel injection located at the intake channel. As a result of this configuration, the flow behavior of the mixture is optimized in terms of the installation of evaporation elements in the intake channel, and an improved transmission of heat to the mixture and a homogeneous mixture formation are achieved. In addition, sealing problems between the intake channel and the surroundings are solved in a simple way.

4 Claims, 1 Drawing Sheet

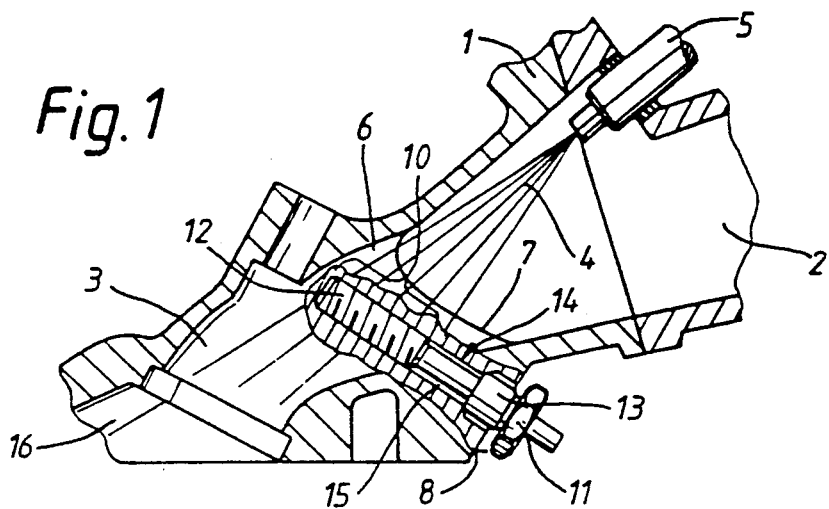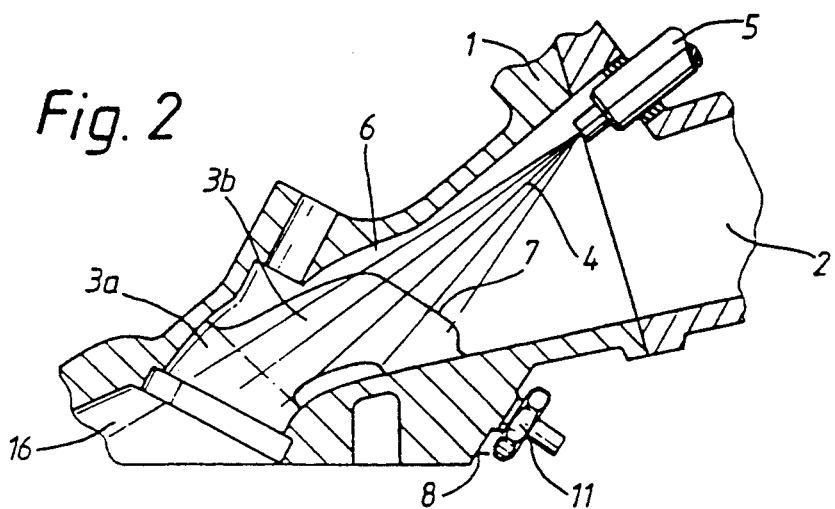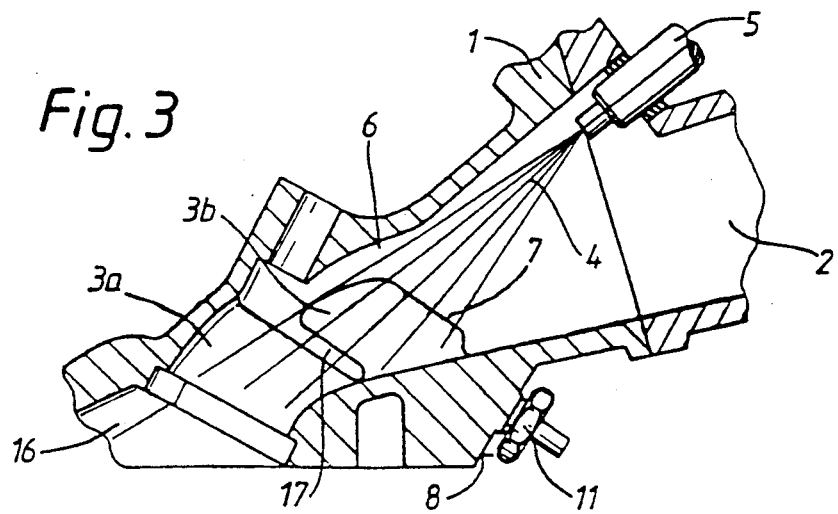

EVAPORATION ELEMENT IN AN INTERNAL-COMBUSTION ENGINE CYLINDER HEAD

BACKGROUND AND SUMMARY OF THE INVENTION

The present invention relates to an evaporation element in the intake channel of a cylinder head of an internal-combustion engine, and, more particularly, to an evaporation element electrically heatable and subjected to fuel from a fuel injection located at the intake channel.

An evaporation element is shown in German Offenlegungsschrift 2,545,430. A carburetor engine has a wall of the intake channel heated via an electrical heating plate embedded in the wall, so that the fuel condensing on the channel wall when the engine is cold is evaporated. The fuel-mixture formation is thus improved and consequently the emission of hydrocarbons during cold starting being reduced. Furthermore, in fuel-injection engines of the type described in U.S. Pat. No. 3,760,780, an electrical heating bar is introduced into the intake channel for the same purpose of evaporating the fuel injected into the channel.

The use of a heating plate embedded in the channel wall in a carburetor engine, with a bend section preceding the plate for a tangential flow, or of a heating bar projecting into the channel in fuel-injection engines brings about, however, an undesirable flow resistance. At least where the heating bar is concerned the heat transfer is low and inhomogeneities occur in the mixture. Furthermore, sealing problems between the intake channel and the surroundings also arise in respect of the evaporation elements introduce into the channel.

An object on which the present invention is based is, therefore, to avoid such problems arising in fuel-injection engines and, at the same time, to improve the fuel-mixture formation during cold starting.

According to the invention, this object has been achieved using a partition wall to divide the intake channel and to form the evaporation element in a multi-valve engine.

Thus, a partition wall dividing the intake channel into, for example, two inlet-valve channels constitutes the electrically heatable evaporation element in multi-valve fuel-injection engines. Since the fuel injection takes place at high speed largely tangentially relative to the partition wall, a good heat transmission is guaranteed. Because of the position at the center of the air flow, the partition wall acting as the evaporation element is conducive to the formation of a highly homogeneous air/fuel mixture. Moreover, heaters projecting into the intake channel are avoided, thereby achieving a more favorable flow behavior of the air/fuel mixture in the intake channel and consequently a higher power output. Also sealing problems arising in respect of evaporation elements introduced into the intake channel are solved in a simple way.

According to another feature of the present invention, a heating of the partition wall is achieved in a constructionally simple way.

To reduce heat losses occurring as a result of the transmission of heat from the heating bar or partition wall to the surrounding cylinder-head housing, it is advantageous to configure the evaporation element (or partition wall) in one of several special ways. In particular, outside the partition wall the heating bar forms with the surrounding bore wall an air-insulating gap, so that the transmission of heat from the heating bar to the side wall of the cylinder head is low in this region. Alternatively, in an upper region of the intake channel the partition wall is made free-standing, thus reducing the transmission of heat from the partition wall to the cylinder-head housing. In yet another embodiment, the partition wall possesses, at the transition to the free-standing portion, a perforation extending transversely in the partition wall.

BRIEF DESCRIPTION OF THE DRAWINGS

These and other objects, features and advantages of the present invention will become more apparent from the following detailed description of presently preferred embodiments when taken in conjunction with the accompanying drawings wherein:

FIG. 1 is a partial longitudinal cross-sectional view through a portion of the cylinder head of a multi-valve engine with an intake channel, with a partition wall according to the present invention located therein, arranged in the region of the gas inlet and having a screwed-in heating bar, and with an injection nozzle;

FIG. 2 is a partial, longitudinal cross-sectional view of a cylinder head portion similar to FIG. 1 but with a partition wall free-standing in an upper region of the intake channel; and FIG. 3 is a partial longitudinal cross-sectional view of a cylinder-head portion similar to FIG. 2 but with a perforation extending transversely in the partition wall.

DETAILED DESCRIPTION OF THE DRAWINGS

FIG. 1 illustrates a housing portion of a cylinder head 1 of a multi-valve engine, this portion containing an intake channel 2. In the region of the inlet valves whose general construction and location are well known in the engine art, a partition wall 3 is provided in the intake channel 2 and extends in the direction of flow so as to divide the channel 2 in the middle into plural inlet-valve channels. A fuel jet 4 from the injection nozzle 5 located in an upper region 6 of the intake channel 2 sprays the partition wall 3 substantially tangentially in a known manner. A bore 9 extends in the partition wall 3 at a short distance from a flow-facing edge 7 and starts from a cylinder-head sidewall 8 located underneath the intake channel 2. The bore 9 has a threaded portion 10 within the partition wall 3. An electrical heating bar 11, likewise possessing a thread on one portion 12, is screwed into the threaded portion 10 of the bore 9, and with another portion 13, forms with a wall 14 of the bore 9 an air-insulating gap 15 in the region of the side wall 8.

With the heating bar 11 switched on, the partition wall 3 is heated until the fuel jet 4 striking the partition wall substantially tangentially is evaporated on impact. The generated vapor mixes with the fresh intake air and flows via the inlet valves into a main combustion space 16.

According to the embodiment of FIG. 2, the partition wall 3 is made free-standing in the upper region 6 of the intake channel 2. This reduces the dissipation of heat into adjacent housing walls of the cylinder head 1.

In the embodiment of FIG. 3, the partition wall 3 is divided into a continuous wall portion 3a located immediately in front of the inlet-valve seats and a free-standing wall portion 3b following in the upstream direction and separated from the wall portion 3a by a perforation 17. The free-standing wall portion 3b thereby projects in a fin-like manner from the lower side of the intake channel 2 into the channel cross-section which, in this case, contains the heating bar 11.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. In an intake channel of a cylinder head of a multi-valve internal-combustion engine, the improvement comprising an electrically heatable evaporation bar located so as to be subjected to fuel from a fuel injector located at the intake channel and arranged in a partition wall dividing the intake channel wherein the partition wall has a bore starting from a cylinder-head side wall with a threaded portion, in which is screwed a threaded portion of the heating bar.

2. The evaporation element according to claim 1, wherein another portion of the heating bar forms an air-insulating gap with a wall of the bore.

3. The evaporation element according to claim 2, wherein the partition wall is free-standing in an upper region of the intake channel.

4. The evaporation element according to claim 3, wherein the partition wall has a transition defining a perforation extending transversely in the partition wall.

* * * * *